(No Model.)

O. P. LOOMIS.
WIRING BLOCKS FOR ELECTRICAL CIRCUITS.

No. 396,579. Patented Jan. 22, 1889.

Witnesses,
Geo. W. Breck.
Edward Thorpe.

Inventor,
Osborn P. Loomis
By his Attorney
Fowler & Fowler

N. PETERS, Photo-Lithographer, Washington, D. C.

UNITED STATES PATENT OFFICE.

OSBORN P. LOOMIS, OF SOMERVILLE, MASSACHUSETTS, ASSIGNOR TO THE LOOMIS ELECTRIC MANUFACTURING COMPANY, OF NEW YORK.

WIRING-BLOCK FOR ELECTRICAL CIRCUITS.

SPECIFICATION forming part of Letters Patent No. 396,579, dated January 22, 1889.

Application filed August 17, 1887. Serial No. 247,164. (No model.)

*To all whom it may concern:*

Be it known that I, OSBORN P. LOOMIS, a citizen of the United States, residing at Somerville, in the county of Middlesex and State of Massachusetts, have invented certain new and useful Improvements in Wiring-Blocks for Electrical Circuits, of which the following is such a full, clear, and exact description as will enable any one skilled in the art to which it appertains to make and use the same, reference being had to the accompanying drawings, forming part of this specification.

My invention relates more particularly to wiring-blocks to be used with incandescent-light circuits, and has been designed as an improvement on such devices.

The invention consists of a wiring-block preferably supplying both sides of the main wires, and includes a fuse in each circuit, which is inserted therein in a simple manner and is of small expense.

It also consists in connecting the main wire and branch or subsidiary wire by one device of peculiar construction; and it consists, also, in certain novel features and arrangements, to be hereinafter set forth in detail, which will be pointed out in the claims making a part hereof.

Figure 1:
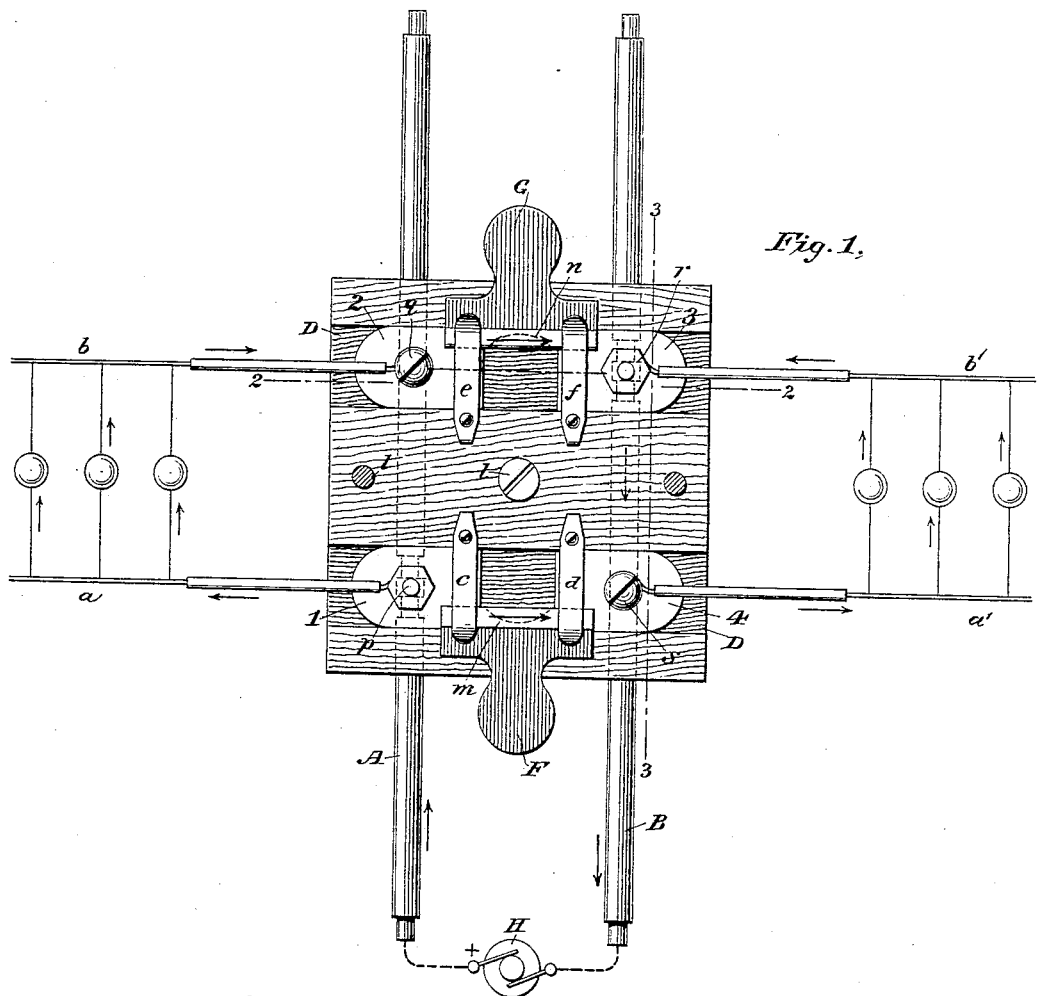
Figure 2:
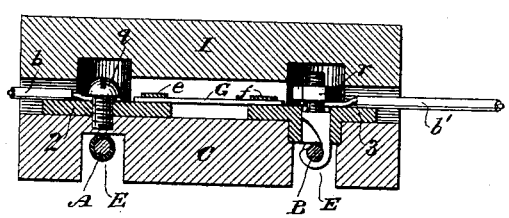
Figure 3:
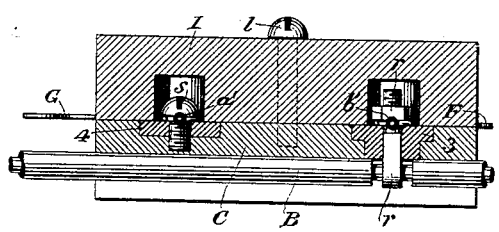

Figure 1 is a plan view of a wiring-block embodying my invention with the top removed. Fig. 2 is a section thereof on line 2 2 of Fig. 1, and Fig. 3 is a section on line 3 3 of Fig. 1.

The same letters indicate the some parts throughout the three figures of the drawings.

A and B are two main conductors carrying the supply of electricity from a generator, H, the former being the positive and the latter the negative wire.

Arrows in Fig. 1 show the paths of the current. To construct a wiring-block after my invention, a piece of wood, C, is provided. Two channels or grooves, D D and E E, are planed therein at right angles to each other on opposite sides. The latter grooves are to receive the supply-conductors A B, and the former are fitted with metal pieces 1 2 3 4, provided with attaching devices $p$ $q$ $r$ $s$, respectively. The clamps $p$ $r$ hold in place the main conductors A B, the insulation being previously stripped off at two places, as shown in Figs. 1 and 3, to prevent cutting the wires. The subsidiary wires $a$ $b'$ are also fastened in place, thereby making electrical connection between the circuits $a$ $b$ $a'$ $b'$ and the main conductors A B. The screws $q$ $s$ merely fasten the subsidiary wires $b$ $a'$ to the block, making connection therewith, but of themselves have no electrical communication with the main wires A and B. (See Figs. 2 and 3.) The clamping devices $p$ $r$ are alike in every respect, and so also are the screws $q$ $s$. The metal pieces 1 2 3 4 should be carefully insulated from the wood of the block.

Two sets of metal springs, $c$ $d$ and $e$ $f$, are screwed to the block, and tongues F G, of non-conducting fiber provided with strips of tin-foil $m$ $n$, respectively, are adapted to be inserted between each set of springs and the metal pieces before alluded to, so as to complete the circuit through the tin-foil strips. The foil is wrapped around the edge of the tongues, which are cut away at their middle, as shown by the curved dotted lines in Fig. 1, so as to allow the foil to flash and not to char the fiber.

$a$ $b$ and $a'$ $b'$ are two subsidiary or consumption circuits connected with the main conductors A B and contain incandescent lamps or other electro-receptive devices therein. The wires $a$ $a'$ are connected with main conductor A and the wires $b$ $b'$ with main conductor B, the circuit between the same being completed through the incandescent lamps shown in multiple therewith.

The block is provided with a cover, I, recessed to fit over the same, and may be secured thereto by screws $z$ $z$.

The current passes from the positive conductor A to the clamp or attaching device $p$, where it splits, part going to the wire $a$ and incandescent lamps to wire $b$, to screw $q$, via metal piece 2, tin-foil $n$ on tongue G to metal piece 3; then to clamp $r$, to negative or return conductor B, back to the generator, the wire $b$ at screw $q$ having no metallic connection with main conductor A, as described before. The other part of the current goes from $p$ to the foil $m$ upon the tongue F, to metal piece 4 and screw $s$, to wire $a'$, as screw $s$ does not make metallic connection with conductor B, and from wire $a'$ it passes through the incandescent lamps to wire $b'$, and via clamp $r$ to the negative conductor B. Thus it will be seen that tongue G, bearing the fusible foil, protects the group of lamps in circuit $a\,b$, and the tongue F protects the lamps in circuit $a'\,b'$ in the same way, so that if the lamp-wires on either side should be accidentally crossed or short-circuited the foil will melt and open that circuit, thus protecting the dynamo and allowing the group of lamps in the other circuit to burn. So, too, the block might protect the dynamo and some of the lamps from a lighting charge when the wires are struck. The block would also operate to cut the lamps out before serious damage could be done by an abnormal rise of current.

The springs $c\,d\,e\,f$ merely serve to hold the tongues F and G in place and keep the tin-foil on said tongues in contact with the metal pieces. It will be evident that these tongues can be readily withdrawn and replaced by new ones or by new tin-foil. Each wiring-block may be provided with several extra ones, if necessary.

The clamping devices $p\,r$ are of novel construction. They consist of a screw part, which has a curved clamp extending therefrom for receiving the main conductors, and a nut that works on the screw part, binding the subsidiary circuit and grasping tightly the main conductor by one operation, (turning the nut,) so that the tighter the nut is screwed down upon the subsidiary wire the more firmly will it draw the clamp against the main conductor.

Any number of blocks may be used along the circuit A B to supply groups of lamps located along the route. The advantages of the wiring-block are compactness, cheapness, ease of installation, and safety, the contacts and connections being so far apart that there is no danger of cross-circuits in the block.

It will be evident to those skilled in the art that the devices I have described may be varied and still be within the scope of what I now desire to claim and secure by Letters Patent of the United States, which is—

1. A safety-strip for electric circuits, consisting of a thin piece of vulcanized non-conducting fiber of the form shown and described, with a projecting thumb-piece and a cut-away edge having tin-foil wrapped around the same, and spring terminals adapted to hold the same in place and complete the circuit by way of the tin-foil, substantially as described.

2. The combination of the conductors A B, the metal pieces 1 2 3 4, mounted in a grooved block of non-conducting material, the subsidiary conductors $a\,b\,a'\,b'$, clamping devices $p\,r$, for the main conductors and one terminal of the subsidiary conductors, binding-screws $q\,s$, for the other terminals thereof, and fusible connections between said metal pieces 1 3 and 2 4.

3. The combination of the conductors A B, the metal pieces 1 2 3 4, mounted in a grooved block of non-conducting material, the subsidiary conductors $a\,b\,a'\,b'$, clamping devices $p\,r$, for the main conductors and one terminal of the subsidiary conductors, binding-screws $q\,s$, for the other terminals thereof, springs $c\,d\,e\,f$, mounted upon said block over said metal pieces, and removable tongues or strips F G of non-conducting material or fiber bearing tin-foil, bridging the space between the metal pieces and springs, in the manner and for the purpose described.

In testimony whereof I have hereunto set my hand and seal, this 13th day of August, 1887, in the presence of two subscribing witnesses.

OSBORN P. LOOMIS. [L. S.]

Witnesses:
 CHAS. A. PIERCE,
 CHARLES D. THOMPSON.